United States Patent
Hsieh et al.

(10) Patent No.: US 8,691,928 B2
(45) Date of Patent: Apr. 8, 2014

(54) POLYMER ELECTROLYTE MATERIALS BASED ON BLOCK COPOLYMERS

(75) Inventors: Bing Hsieh, Pleasanton, CA (US); Hany Basam Eitouni, Oakland, CA (US); Mohit Singh, Berkeley, CA (US)

(73) Assignee: Seeo, Inc., Hayward, CA (US)

( * ) Notice: Subject to any disclaimer, the term of this patent is extended or adjusted under 35 U.S.C. 154(b) by 176 days.

(21) Appl. No.: 13/060,944

(22) PCT Filed: Aug. 22, 2009

(86) PCT No.: PCT/US2009/054709
§ 371 (c)(1),
(2), (4) Date: Feb. 25, 2011

(87) PCT Pub. No.: WO2010/027716
PCT Pub. Date: Mar. 11, 2010

(65) Prior Publication Data
US 2012/0029099 A1      Feb. 2, 2012

Related U.S. Application Data

(60) Provisional application No. 61/091,626, filed on Aug. 25, 2008.

(51) Int. Cl.
*C08G 77/12* (2006.01)

(52) U.S. Cl.
USPC ............................................................ 528/31

(58) Field of Classification Search
USPC ............................................................ 528/31
See application file for complete search history.

(56) References Cited

U.S. PATENT DOCUMENTS

| | | | |
|---|---|---|---|
| 5,419,984 A | 5/1995 | Chaloner-Gill | |
| 6,337,383 B1 | 1/2002 | West | |
| 6,620,308 B2 | 9/2003 | Gilbert | |
| 6,887,619 B2 | 5/2005 | West | |
| 2004/0214090 A1 | 10/2004 | West | |
| 2004/0248014 A1 | 12/2004 | West | |
| 2005/0170254 A1 | 8/2005 | West | |
| 2006/0035154 A1 | 2/2006 | West | |
| 2011/0239535 A1 * | 10/2011 | Conrad | 47/57.6 |
| 2012/0251637 A1 * | 10/2012 | Bartholomaus et al. | 424/734 |

FOREIGN PATENT DOCUMENTS

| | | | |
|---|---|---|---|
| JP | 2004 189959 | * | 4/2004 |
| WO | 2007/142731 A1 | | 12/2007 |

OTHER PUBLICATIONS

JP 2004 189959 Abstract (2004).*
Lyons, et al., "Polymer electrolytes based on polysilane comb polymers," Solid State Ionics 91, 169-173 (1996).
Pyun et al., "Synthesis of Nanocomposite Organic/Inorganic Hybrid Materials Using Controlled/Living Radical Polymerization." Chemical Matters, 2001, vol. 13, pp. 3426-3438 Aug. 2001 (Mar. 8, 2001).

* cited by examiner

*Primary Examiner* — Kuo-Liang Peng
(74) *Attorney, Agent, or Firm* — R'Sue Popowich Caron

(57) ABSTRACT

The present invention relates generally to electrolyte materials. According to an embodiment, the present invention provides for a solid polymer electrolyte material that has high ionic conductivity and is mechanically robust. An exemplary material can be characterized by a copolymer that includes at least one structural block, such as a vinyl polymer, and at least one ionically conductive block with a siloxane backbone. In various embodiments, the electrolyte can be a diblock copolymer or a triblock copolymer. Many uses are contemplated for the solid polymer electrolyte materials. For example, the novel electrolyte material can be used in Li-based batteries to enable higher energy density, better thermal and environmental stability, lower rates of self-discharge, enhanced safety, lower manufacturing costs, and novel form factors.

16 Claims, No Drawings

POLYMER ELECTROLYTE MATERIALS BASED ON BLOCK COPOLYMERS

CROSS-REFERENCE TO RELATED APPLICATIONS

This application claims priority to U.S. Provisional Patent Application No. 61/091,626, filed Aug. 25, 2008, and to International Patent Application Number PCT/US09/54709, filed Aug. 22, 2009 both of which are incorporated by reference herein. This application is also related to U.S. Provisional Patent Application 61/056,688 (now abandoned), filed May 28, 2008, which is incorporated by reference herein.

BACKGROUND OF THE INVENTION

Field of the Invention

This invention relates generally to high ionic conductivity block copolymer electrolytes, and, more specifically, to high ionic conductivity block copolymer electrolytes in which one block is made of polysiloxanes having ethylene oxide or other pendant groups and another block is made of a polymer that provides a rigid structure.

The increased demand for lithium secondary batteries has resulted in research and development to improve the safety and performance of these batteries. Many batteries employ liquid electrolytes associated with high degrees of volatility, flammability, and chemical reactivity. A variety of polysiloxane-based electrolytes have been developed to address these issues. Examples include polysiloxane materials that contain pendant oligomeric ethylene oxide groups prepared from poly(methylhydrosiloxanes), wherein the starting polymethylhydrosiloxane reacts with a vinyl or hydroxyl oligomeric ethylene oxide in the presence of a catalyst to give the respective electrolyte. However, these polysiloxane-based electrolytes typically have a low ionic conductivity that limits their use to applications that do not require high rate performance. In addition, these materials do not have adequate mechanical properties to serve as an electrolyte without the use of a separate mechanically rigid material. As a result, there is a need for electrolytes that include polysiloxane-based electrolytes with an increased ionic conductivity and improved mechanical properties.

Highly conducting polymer electrolytes based on block copolymers of styrene and ethylene oxide have been disclosed previously, for example, in WO07142731 and WO07113236. The approximate chemical structures of these polymers are shown below, wherein m and n are the numbers of repeat units for the polystyrene and polyethylene oxide blocks respectively.

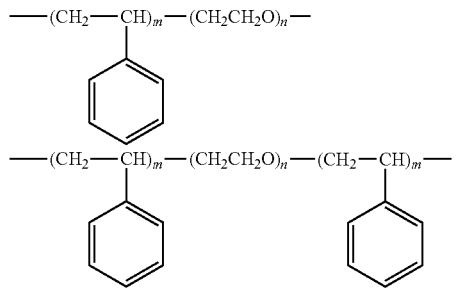

Such block copolymers have a unique lamella morphology that results in both high modulus and relatively high ionic conductivity at 80° C. However, there is a strong need for polymer electrode materials with high ionic conductivity ($10^{-4}$–$10^{-5}$ S/cm) at room temperature. Known polymer electrolyte materials with high room temperature ionic conductivity include polysiloxanes and polyphosphazenes having oligomeric ethylene oxide pendant groups (see Macromolecules 2005, 38, 5714-5720, which is included by reference herein). The remarkable room temperature conductivity for these polymers has been ascribed to their highly flexible inorganic backbones which produce an amorphous polymer matrix with a very low glass transition temperature. Being flexible and amorphous, these polymers have a very low modulus and are prone to creep when used in a battery, thus reducing the battery's lifespan.

The present invention relates to block copolymers that include a siloxane-based polymer block and a structural polymer block. These block copolymers can be combined with salts (such as lithium salts) to create ionically conductive materials that are solid at desirable operating temperatures for use in batteries and the like.

DETAILED DESCRIPTION

The embodiments of the present invention relate to block copolymers with both structural polymer blocks and siloxane-based polymer blocks. The siloxane-based blocks can be combined with salts (e.g., lithium salts) to enhance their ionic conductivity. Such block copolymers, which are both ionically conductive and have good mechanical properties, can be used advantageously for batteries and other energy storage devices such as capacitors. The skilled artisan will readily appreciate, however, that the materials and methods disclosed herein will have application in a number of other contexts where conductive polymers are desirable, particularly where material properties such as high elastic modulus and toughness are important.

In order to provide electrolyte materials with both high conductivity and mechanical stability, a new class of electrolyte materials based on block copolymers whose blocks include thermoplastic polymers and oligo (ethylene oxide) grafted polysiloxanes has been developed. As is well known to a person of ordinary skill in the art, thermoplastic polymers include both semi crystalline and glassy or amorphous polymers. Semicrystalline polymers usually have both crystalline regions and amorphous or glassy regions. The crystalline regions can represent only a small fraction of the overall polymer volume or they can represent most of the polymer volume and any fraction in between, morphology and The mechanically rigid properties of thermoplastic polymers can improve the mechanical properties of these electrolyte materials. In one embodiment of the invention, the thermoplastic block comprises a vinyl polymer. The vinyl polymer can include one or more monomers such as ethylene, propylene, stryrene, vinyl cyclohexane, vinyl prydine, alkyl acrylate, methyl acrylate, tetrafluoroethylene, and acrylonitrile. In another embodiment of the invention, the thermoplastic block comprises polydiene (containing one or more monomers from butadiene, isoprene, etc.), polyamide (e.g., nylon), polyimide, polysilane, and/or polyester (e.g., polycarbonate). The block copolymers can be diblocks or triblocks with either ABA or BAB morphologies.

The general structures of the block copolymers are shown below, wherein the R group is an ethylene oxide containing group, and x and y are the numbers of repeat units of the polystyrene block and the polysiloxane block, respectively.

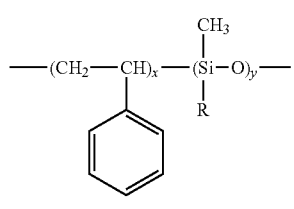

Poly(St-b-SiEO) diblock

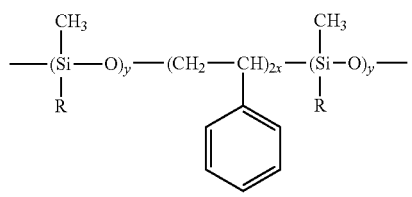

Poly(SiEO-b-St-b-SiEO) triblock

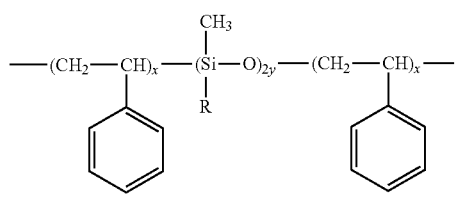

Poly(St-b-SiEO-b-St) triblock

The range of x and y is from about 10 to 3000, and the R groups can be selected from, but are not limited to, the following structures:

—(CH$_2$)$_3$O—(CH$_2$CH$_2$O)$_i$—CH$_3$

—(CH$_2$)$_2$Si(CH$_3$)$_2$OSi(CH$_3$)$_2$—(CH$_2$)$_3$O—(CH$_2$CH$_2$O)$_i$—CH$_3$

—(CH$_2$)$_2$Si(CH$_3$)$_2$—(CH$_2$)$_3$O—(CH$_2$CH$_2$O)$_i$—CH$_3$

—(CH$_2$)$_2$Si(CH$_3$)$_2$—O—(CH$_2$CH$_2$O)$_i$—CH$_3$ wherein i is an integer ranging from 1 to 20.

The new block copolymer electrolyte materials can be obtained via a sequential anionic polymerization as shown in the following scheme:

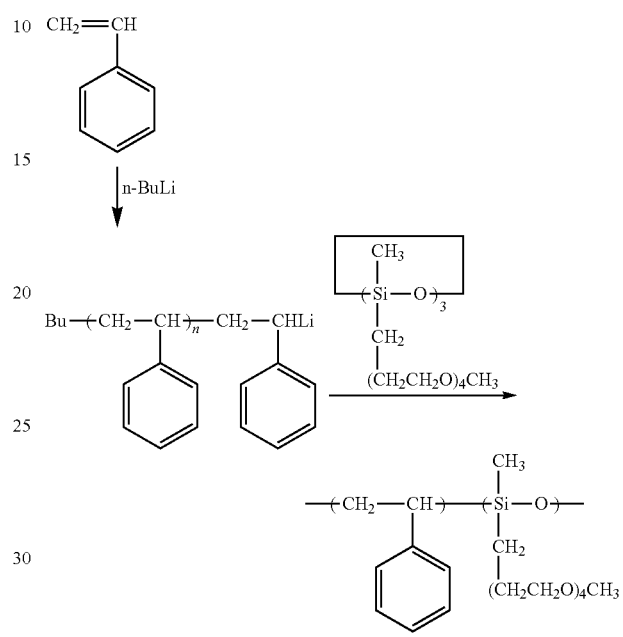

Alternatively, the block copolymer electrolyte materials can be obtained by a sequential anionic polymerization to give a pre-block copolymer which is then grafted with a oligo (ethylene oxide) pendant group, as illustrated below. In one embodiment of the invention, this method has been used to prepare the novel diblock copolymer electrolyte.

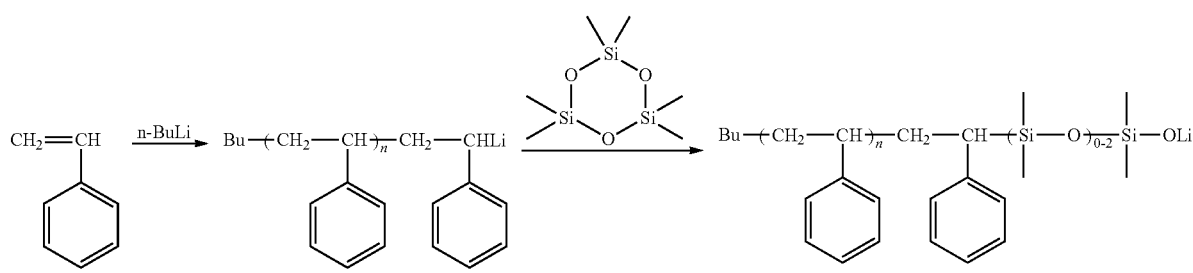

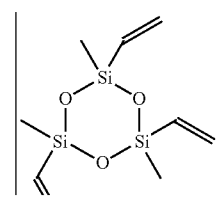

-continued

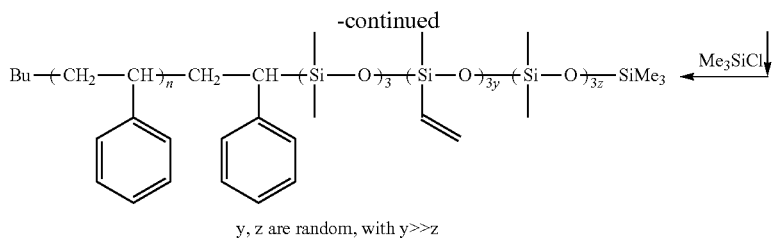

y, z are random, with y>>z

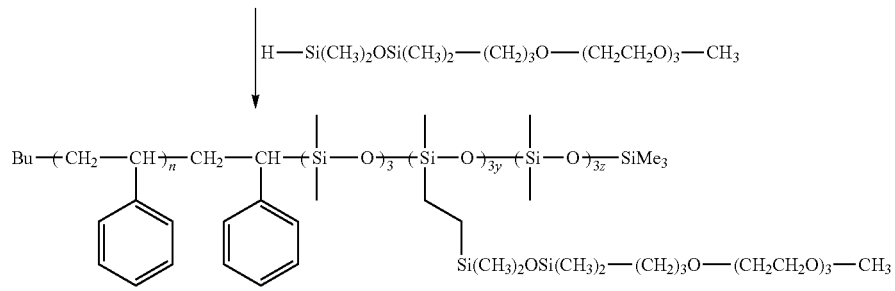

Siloxane Block

In one embodiment of the invention, a block copolymer contains a block that has a polysiloxane backbone to which pendant groups can be grafted. The pendant groups have the following structure, wherein x is an integer with values ranging from 2 to 12.

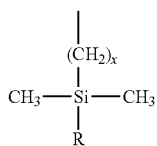

The overall structure of the polymer block is:

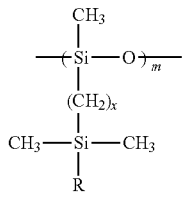

(1)

wherein x is an integer with values ranging from 2 to 12, R can be selected individually for each siloxane repeat unit in the backbone and m is an integer ranging from about 2 to 2000. In some arrangements, there are some siloxane repeat units in the backbone where structure (1) is absent. R can be an oligoethylene-oxide-containing group. In one arrangement, at least one R is an oligoethylene-oxide-containing group. R can also be a highly polar group, such as an ethylene carbonate, a cyano group, an N-pyrrolidone group, or a perfluoroalkyl group. In one arrangement, the polymer block is a homopolymer when only one R moiety is used for all repeat units. In another arrangement, the polymer block is a random copolymer with only two different R($R_1$, $R_2$) moieties distributed randomly among the repeat units. In another arrangement, the polymer block is a random terpolymer with only three different R($R_1$, $R_2$, $R_3$) moieties distributed randomly among the repeat units. In yet another arrangement, there can be any number of different R moieties attached randomly to the repeat units.

The polymer block structures described above can be represented by the following formulas:

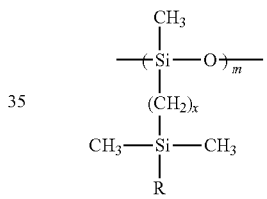

Homopolymer

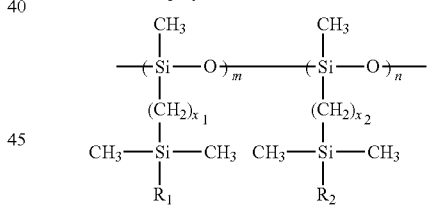

random copolymer

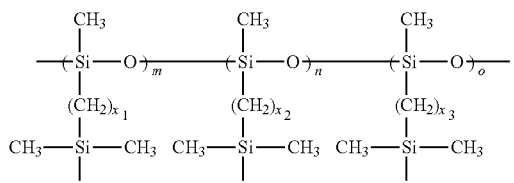

random terpolymer wherein integers $x_1$, $x_2$, and $x_3$ each have any value ranging from 2 to 12, and integers m, n, o can each have any value between about 2 and 2000. In another arrangement, m, n, o can each have any value between about 10 and 1000.

Examples of oligoethylene-oxide-containing groups that are suitable for R include, but are not limited to the following groups:

—O—(CH$_2$CH$_2$O)$_i$—CH$_3$

—(CH$_2$)$_3$O—(CH$_2$CH$_2$O)$_i$—CH$_3$

—OSi(CH$_3$)$_2$—(CH$_2$)$_3$O—(CH$_2$CH$_2$O)$_i$—CH$_3$

—OSi(CH$_3$)$_2$—OSi(CH$_3$)$_2$—(CH$_2$)$_3$O—(CH$_2$CH$_2$O)$_i$—CH$_3$

—O—(CH$_2$CH$_2$CH$_2$O)$_i$—CH$_3$

—(CH$_2$)$_3$O—(CH$_2$CH$_2$CH$_2$O)$_i$—CH$_3$

—OSi(CH$_3$)$_2$—(CH$_2$)$_3$O—(CH$_2$CH$_2$CH$_2$O)$_i$—CH$_3$

—OSi(CH$_3$)$_2$—OSi(CH$_3$)$_2$—(CH$_2$)$_3$O—(CH$_2$CH$_2$CH$_2$O)$_i$—CH$_3$

—O—(CH$_2$CH$_2$O)$_i$—(CH$_2$CH$_2$CH$_2$O)$_j$—CH$_3$

—OSi(CH$_3$)$_2$—OSi(CH$_3$)$_2$OSi(CH$_3$)$_2$—(CH$_2$)$_3$O—(CH$_2$CH$_2$O)$_i$—CH$_3$

—OSi(CH$_3$)$_2$OSi(CH$_3$)$_2$OSi(CH$_3$)$_2$OSi(CH$_3$)$_2$—(CH$_2$)$_3$O(CH$_2$CH$_2$O)$_i$—CH$_3$

—CH$_2$CH$_2$Si(CH$_3$)$_2$—(CH$_2$)$_3$O(CH$_2$CH$_2$O)$_i$—CH$_3$ wherein i is an integer in the range of about 1 to 8.

Other oligoethylene-oxide-containing groups that are suitable for R include, but are not limited to some that contain double ethylene oxide strains such as:

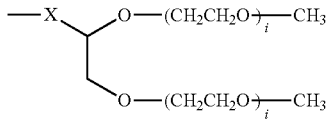

wherein X can be, but is not limited to:

—OSi(CH$_3$)$_2$—(CH$_2$CH$_2$)—

—(CH$_2$CH$_2$)—

—(CH$_2$)$_3$OCH$_2$

—OSi(CH$_3$)$_2$—(CH$_2$)$_3$OCH$_2$— and wherein i is an integer in the range of about 1 to 8.

Examples of ethylene-carbonate-containing groups that are suitable for R include, but are not limited to the following groups:

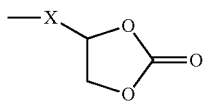

wherein X can be, but is not limited to:

—OSi(CH$_3$)$_2$—(CH$_2$CH$_2$)—

—(CH$_2$CH$_2$)—

—(CH$_2$)$_3$OCH$_2$

—OSi(CH$_3$)$_2$—(CH$_2$)$_3$OCH$_2$—;

—OCH$_2$;

and

—OCH$_2$CH$_2$—

Examples of cyano groups that are suitable for R include, but are not limited to the following groups:

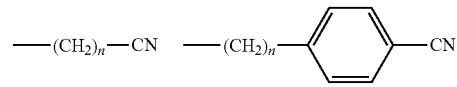

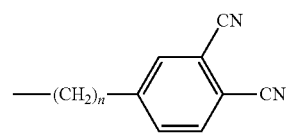

wherein n is an integer in the range of about 1 to 10.

Examples of N-pyrrolidone groups that are suitable for R include, but are not limited to the following:

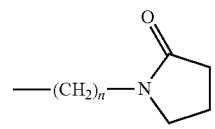

wherein n is an integer in the range of about 1 to 8.

Examples of perfluoroalkyl groups that are suitable for R include, but are not limited to the following:

—(CH$_2$)$_m$(CF$_2$)$_n$—F wherein m and n are integers that are selected independently and are in the range of about 1 to 8.

In one embodiment of the invention, the polysiloxane chain is represented by:

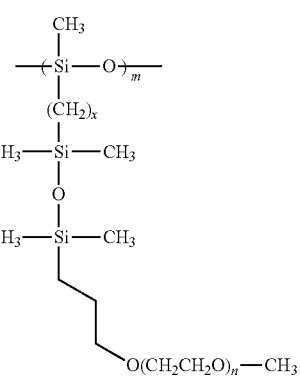

wherein x is an integer with values ranging from 2 to 12, integer m can each have any value between about 2 and 2000, and n is an integer ranging from about 1 to 100.

In another embodiment of the invention, the polysiloxane chain is represented by:

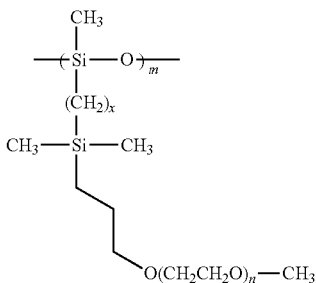

wherein x is an integer with values ranging from 2 to 12, integer m can each have any value between about 2 and 2000, and n is an integer ranging from about 1 to 100.

In yet another embodiment of the invention, the polysiloxane chain is represented by:

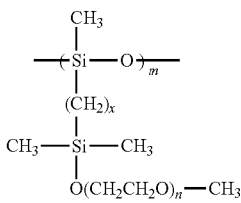

wherein x is an integer with values ranging from 2 to 12, integer m can each have any value between about 2 and 2000, and n is an integer ranging from about 1 to 100.

The polysiloxane polymers described above can be used as a conductive block in a novel block copolymer electrolyte for electrochemical devices.

Other ionically conductive polymers based on polysiloxanes can also be used as the conducting blocks in the novel block copolymers disclosed herein. Exemplary polysiloxane-based electrolytes with good ionic conductivity are discussed below. All references listed are included by reference herein for all purposes.

Highly conducting polymer electrolytes based on polysiloxanes have been disclosed by West, et al. U.S. Pat. No. 6,337,383 discloses solid polysiloxane polymers with multiple oligooxyethylene side chains per silicon. The multiple oligooxyethylene side chains are each connected directly to the silicons, or they can be linked by a branching structure and then jointly linked to the silicons.

In U.S. Patent Publication Number 2004/0248014, West et al. disclose an electrolyte that includes a polysiloxane having one or more backbone silicons linked to a first side chain and one or more backbone silicons linked to a second side chain. The first side chains include a poly(alkylene oxide) moiety and the second side chains include a cyclic carbonate moiety.

In U.S. Patent Publication Number 2004/0214090, West et al. disclose a cyclic siloxane polymer electrolyte having poly (siloxane-g-ethylene oxides) with one or more poly(ethylene oxide) side chains directly bonded to Si atoms.

In U.S. Pat. No. 6,887,619, West et al. disclose cross-linked polysiloxane polymers having oligooxyethylene side chains. Lithium salts of these polymers can be synthesized as a liquid and then caused to solidify in the presence of elevated temperatures to provide a solid electrolyte useful in lithium batteries.

In U.S. Patent Publication Number 2005/0170254, West et al. disclose disiloxanes that include a backbone with a first silicon and a second silicon. The first silicon is linked to a first substituent selected from a group consisting of: a first side chain that includes a cyclic carbonate moiety; a first side chain that includes a poly(alkylene oxide) moiety; and a first cross link links the disiloxane to a second siloxane and that includes a poly(alkylene oxide) moiety. The second silicon can be linked to a second substituent selected from a group consisting of: a second side chain that includes a cyclic carbonate moiety, and a second side chain that includes a poly (alkylene oxide) moiety.

U.S. Patent Publication Number 2006/0035154 discloses an electrolyte that includes one or more tetrasiloxanes. The tetrasiloxanes have a backbone with two central silicons and two terminal silicons. A first one of the silicons is linked to a side chain that includes a poly(alkylene oxide) moiety. A second one of the silicons is linked to a side chain that includes a poly(alkylene oxide) moiety or to a side chain that includes a cyclic carbonate moiety. When each of the central silicons is linked to a side chain that includes a poly(alkylene oxide) moiety, each of the central silicons is directly linked to the poly(alkylene oxide) moiety.

Some of the West copolymers are polysiloxane materials that contain pendant oligomeric ethylene oxide groups prepared mainly from poly(methylhydrosiloxanes), as exemplified in the following scheme, wherein the starting polymethylhydrosiloxane reacts with a vinyl or hydroxyl oligomeric ethylene oxide in the presence of a catalyst to give the electrolyte products:

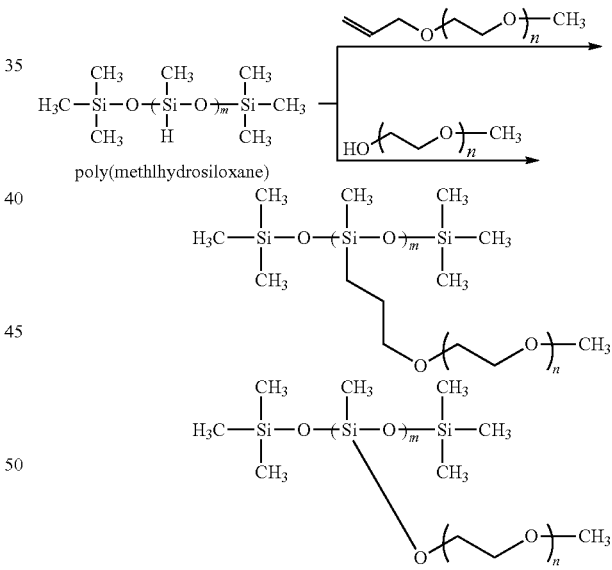

In one embodiment of the invention, polysiloxane polymers are combined with a lithium salt. Lithium salts that can be used in the polymers described herein are not limited, as long as they aid lithium ion conduction in the polymer so it can be used as an electrolyte. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, lithium alkyl fluorophosphates, lithium oxalatoborate, as well as other lithium bis(chelato)borates having five to seven membered rings, LiPF$_3$(C$_2$F$_5$)$_3$, LiPF$_3$(CF$_3$)$_3$, LiB(C$_2$O$_4$)$_2$, and mixtures thereof. In other embodiments of the invention, for other electrochemistries, electrolytes are made by combining the polysiloxane polymers with various kinds of salts. Examples include, but are not limited to $AgSO_3CF_3$, NaSCN, $NaSO_3CF_3$, KTFSI, NaTFSI, $Ba(TFSI)_2$, $Pb(TFSI)_2$, and $Ca(TFSI)_2$.

Block copolymers that contain polysiloxane blocks, as disclosed herein, are more ionically conducting than many other polymer electrolytes that have been employed in batteries. It is known that polymers with flexible backbone chains generally have higher ionic conductivity than do polymers with stiff backbone chains. In addition to having a flexible siloxane backbone chain, the polymers disclosed herein have very flexible silicon-containing side chains. Without wishing to be bound to any particular theory, it may be that the increased flexibility of the side chains increases the ionic conductivity of the polymer further than is possible with stiffer side chain groups.

The basic method of making the polysiloxane polymer blocks can be described generally as allowing a poly(methylvinylsiloxane) to undergo a hydrosilylation reaction with hydrosilane compound(s) in the presence of a metal catalyst. In one arrangement, a platinum catalyst such as chloroplatinic acid and platinum divinyltetramethyl disiloxane complex (also known as the Karstedt's catalyst), platinum cyclovinylmethylsiloxane complex, or platinum octanal/octanol complex is used.

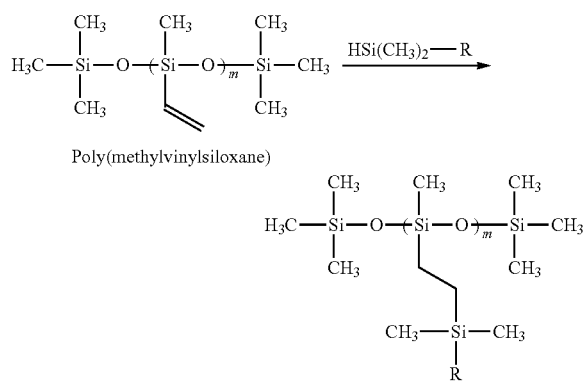

Poly(methylvinylsiloxane)

Examples of processes for synthesizing polysiloxane polymer blocks with particular R groups are given below. The examples are meant to be illustrative and not limiting.

Example 1

A three-neck round flask was equipped with a magnetic stirrer, two addition funnels, a nitrogen inlet, and a rubber septum. Sodium hydride (60% dispersion in mineral oil) (46 g, 1.15 mol) and then inhibitor-free tetrahydrofuran (Aldrich 439215) (500 ml) were added into the flask. Triethylene glycol monomethyl ether (156 ml, 0.976 mol) and allyl bromide (100 ml, 1.155 mol) were placed separately into each of the two addition funnels to await addition into the flask. The mixture was cooled with an ice-water bath, and then the triethylene glycol monomethyl ether was added dropwise from the funnel into the flask. The resulting mixture was stirred at room temperature for at least two hours. The mixture was cooled again with an ice-water bath before the allyl bromide was added dropwise from the funnel into the flask. The resulting mixture was stirred overnight at room temperature. The solid (mostly NaBr) that had formed in the mixture was removed by suction filtration. The solid was rinsed with tetrahydrofuran. The filtrate was concentrated in vacuo (rotavap followed by pump under vacuum) and then vacuum distilled (80-90° C.) to give triethylene glycol allyl methyl ether (structure shown below) as a colorless liquid (169 g, 89%).

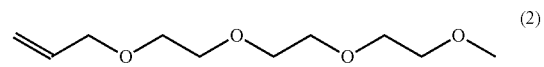

A flask was equipped with a magnetic stirrer and an addition funnel. 1,1,3,3-tetramethydisiloxane (500 g or 660 ml, 3.72 mol) and toluene (300 ml) were added into the flask. Triethylene glycol allyl methyl ether (2) (81.6 g, 0.4 mol), toluene (100 ml), and platinum divinyltetramethyldisilane catalyst (2.1-2.4% platinum concentration) (0.25) were placed in the addition funnel to await addition into the flask. The disiloxane solution was heated to 60-70° C., before adding the triethylene glycol allyl methyl ether solution dropwise. The resulting solution was heated for a total of 24 hours, cooled, and then concentrated in vacuo (rotavap followed by pump under vacuum). The resulting liquid was fractionally distilled under vacuum (bath temperature 130-200° C. and pressure of 0.4-0.8 mm Hg) to give the following fractions: first fraction: 35-93° C. (unwanted unknown materials); second fraction: 95-125° C., (unwanted unknown materials); third fraction: 125-145° C. (58 g). The third fraction was identified as the desired siloxane product, code named 2SiC-4EO, with the following structure:

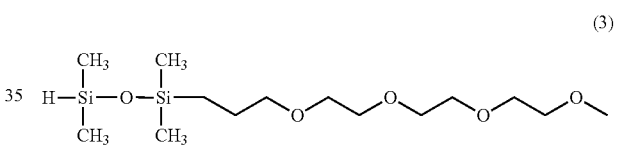

Prepolymer I, poly(styrene-b-methylvinylsiloxane) having about a 50:50 molar ratio of styrene to methylvinylsiloxane was prepared via anionic polymerization as follows. High purity benzene was further purified by treatment with sec-butyllithium using 1,1-diphenylethylene as the indicator. High purity tetrahydrofuran was further purified by treatment with sodium using benzophenone as the indicator. Styrene was purified by dibutylmagnesium treatment and then transferred into a solvent transfer/storage flask with high vacuum Teflon® valve involving a freeze and thaw technique using a high vacuum line. Tetrahydrofuran was similarly transferred in a solvent transfer/storage flask and moved into a glove box. A more detailed description of the high vacuum line and purification procedures can be found in U.S. Provisional Patent Application No. 60/988,085, which is included by reference herein. Dried benzene (about 400 ml) was vacuum transferred into a 2 L reaction flask with a high vacuum valve and a magnetic stirring bar using a freeze-and-thaw technique. The reaction flask was moved into the glove box, and sec-butyl lithium (0.4 ml) was added, followed by addition of styrene (50 ml). The polymerization was allowed to proceed overnight in the glove box (>12 hr), and then hexamethylcyclotrisiloxane (2.0 g) was added through a powder funnel, followed by addition of tetrahydrofuran (200 ml). The yellow color of the polymerization solution disappeared after about 40 min. After an hour, 1,3,5-trivinyl-1,3,5-trimethylcyclotrisiloxane (50 ml) was added, and the polymerization was allowed to proceed for about 22 h. Excess trimethylchlorosilane (2.0 g) was added, and the resulting solution was stirred for 24 h to ensure thorough termination. The resulting solution was precipitated into magnetically stirring methanol (2 L). The white precipitate was allowed to settle and most of the solvent was decanted. Methanol (1000 ml) was added to the precipitate and the resulting mixture was stirred for several minutes. The solvent was decanted and the precipitate was dried by blowing under nitrogen overnight, followed by vacuum drying for 24 hours to yield poly(styrene-b-vinylmethylsiloxane), a white powder (86 g). The styrene/siloxane molar ratio was about 49/51 as determined by NMR analysis.

Prepolymer II, poly(styrene-b-methylvinylsiloxane) having about a 40:60 molar ratio of styrene to methylvinylsiloxane was prepared similarly to the method described above, using the following amounts of ingredients: benzene (about 500 ml), sec-butyl lithium (0.4 ml), styrene (50 ml), hexamethylcyclotrisiloxane (2.0 g), tetrahydrofuran (250 ml), 1,3,5-trivinyl-1,3,5-trimethylcyclotrisiloxane (75 ml), and trimethylchlorosilane (2.0 g). The empirical styrene/siloxane molar ratio was about 36/64 as determined by NMR analysis.

Prepolymer I (2.0 g) and toluene (14 ml) were added into a 100 ml round flask equipped with a magnetic stirrer and then capped with a tightly fitted rubber septum. The mixture was immersed in a 65° C. oil bath and stirred until completely solubilized, after which 2SiC-4EO (5 g) was added. Platinum divinyltetramethyldisilane catalyst (2.0% platinum concentration) (50 µL) was then added, and the flask was capped with the septum and heated at 65° C. for 48 h. The mixture was diluted with toluene (20 ml), and activated charcoal (0.25 g) was added. The mixture was stirred at 65° C. for several hours. The activated charcoal was removed by filtration, and the filtrate was concentrated in vacuo to yield a viscous liquid which was then precipitated into hexane (150 ml) while stirring magnetically. The solvent was decanted, hexane (75 ml) was added, and the mixture was stirred about 1 min and then decanted. This procedure was repeated. The wet solid was transferred into a sample vial and dried under vacuum overnight to yield an ethylene oxide grafted poly(styrene-b-methylvinylsiloxane) as a slightly rubbery solid (3.6 g), identified as Polymer I. The molar ratio of styrene/grafted Si/ungrafted Si was about 57/36/7 as determined by NMR analysis.

Prepolymer II (2.0 g) and toluene (14 ml) were added into a 100 ml round flask equipped with a magnetic stirrer and then capped with a tightly fitted rubber septum. The mixture was immersed in a 65° C. oil bath, stirred until completely solubilized and then 2SiC-4EO (5 g) was added. Platinum divinyltetramethyldisilane catalyst (2.0% platinum concentration) (50 µL) was then added, and the flask was capped with the septum and heated at 65° C. for 48 h. The resulting solution was diluted with toluene (20 ml) and activated charcoal (0.25 g) was added and stirred at 65° C. for several hours and then cooled. The activated charcoal was removed by filtration, and the filtrate was concentrated in vacuo to yield a viscous liquid which was then precipitated into hexane (150 ml) while stirring magnetically. The solvent was decanted, hexane (75 ml) was added, and the mixture was stirred about 1 min and then decanted. This procedure was repeated The wet solid was transferred into a sample vial and dried under vacuum overnight to yield an ethylene oxide grafted poly(styrene-b-methylvinylsiloxane) as soft gluey semi-solid (4.2 g), identified as Polymer II. The molar ratio of styrene/grafted Si/ungrafted Si was about 44/50/6 as determined by NMR analysis.

Prepolymer I (2.0 g) and anhydrous toluene (14 ml) were added into a 100 ml round bottom flask equipped with a magnetic stirrer and then capped with a tightly fitted rubber septum under argon. The mixture was immersed in a 65° C. oil bath, stirred until complete solubilization and then degassed 2SiC-4EO (5 g) and platinum divinyltetramethyldisilane catalyst (2.0% Pt, 50 µL) were then added via syringes. The resulting solution was heated for 48 h and then diluted with toluene (20 ml) and activated charcoal (0.25 g) was added. The resulting mixture was stirred at 65° C. overnight and then cooled. The activated charcoal was removed by filtration, and the filtrate with concentrated in vacuo to yield a viscous liquid which was then precipitated into hexane (150 ml) while stirring magnetically. The solvent was decanted, hexane (75 ml) was added, and the mixture was stirred about 1 min and then decanted. This procedure was repeated The wet solid was transferred into a sample vial and dried under vacuum overnight to yield an ethylene oxide grafted poly(styrene-b-methylvinylsiloxane) as semi-solid (4.2 g), identified as Polymer III. The molar ratio of styrene/grafted Si/ungrafted Si was about 52/47/1 as determined by NMR analysis.

Example 2

Polymer Electrolyte Solution Preparation

Polymer electrolyte solutions were prepared under a controlled argon atmosphere (<0.1 ppm moisture and oxygen gas). Each polymer (Polymer I and Polymer III) was dissolved in separate quantities of tetrohydrofuran (THF). A salt, lithium bis(trifluoromethylsulfone)imide (LiTFSI) was added to the polymer solutions according to a ratio "r" determined by the ethylene oxide (EO) content. The value "r" was defined for the purposes of this procedure as the ratio of the concentrations of Li+ to EO. Values of r ranging from 0.04 to 0.085 were tested on the samples. The ratio of solute mass (polymer+salt) to total solution mass was chosen to be in the range of 5-10 wt % dependent on the physical properties of the polymer and the final state of the material (i.e., as a free standing film or bulk polymer). The polymer+salt (polymer electrolyte) in THF solution was agitated via a stir bar until it became homogenous (i.e., polymer and salt completely solvated in solution).

Preparation of Polymer Electrolyte:

In order to test the ionic conductivity of the polymer, the polymer electrolyte was extracted from solution in any of the following three ways.

1) Free standing films on order of 30 to 100 um thickness were obtained via drop casting (also known as free casting), wherein a polymer electrolyte solution was poured onto a flat surface (e.g., aluminum foil sheet on a vacuum plate) at room temperature. The THF solvent evaporated, leaving a cast film of the polymer electrolyte. The film was then peeled off the flat surface in an argon atmosphere and dried under vacuum at temperatures in the range of 65 to 110° C.

2) The polymer electrolyte was cast onto an aluminum foil. The electrolyte was not removed from the foil; the electrolyte/foil bilayer was used in determining the ionic conductivity of the polymer electrolyte.

3) THF was extracted via roto-vac for initial removal of the majority of solvent followed by an overnight dry under vacuum. The resulting bulk polymer electrolyte was used for ionic conductivity testing.

Test Cell Fabrication and Electrochemical Measurement:

The polymer electrolyte was placed into a symmetric cell with the electrolyte sandwiched between identical or symmetric electrodes, and impedance spectroscopy was performed. In some cells non-blocking electrodes (lithium foil) were used. In some cells blocking electrodes (aluminum foil or gold plated steel current collectors) were used. All cells were constructed in an argon atmosphere with oxygen gas content less than 0.1 ppm and controlled moisture.

1) Freestanding polymer electrolyte films were punched out in a coin shape. The films were pressed between Teflon® sheets at 60° C. at less than about 0.25 ton total applied force. The polymer electrolyte film was sandwiched between steel current collectors laminated with lithium foil and pressed with light force at 60° C. The steel/Li/polymer electrolyte/Li/steel sandwich was placed in a Swagelok® cell.
2) Polymer electrolyte/aluminum bilayers were punched out in a coin shape. Two such bilayer coins were laminated together with electrolyte sides facing one another to form an aluminum/polymer electrolyte/aluminum sandwich. The sandwich was placed in a Swagelok® cell.
3) Bulk polymer electrolyte was placed in the aperture of an insulating spacer. The spacer and polymer were pressed between Teflon® sheets to allow the polymer electrolyte to fill the aperture completely. The polymer and spacer were sandwiched between steel current collectors laminated with Li foil. The Li/polymer electrolyte/Li sandwich was placed in a Swagelok® cell.

Potentioelectrochemical impedance spectroscopy (PEIS) was performed on each Swagelok® cell to determine the ionic conductivity of the electrolytes. Ionic conductivity results are shown below.

| Polymer | Ionic conductivity at 25° C. (Scm$^{-1}$) |
|---|---|
| I | 5.4 × 10$^{-6}$ |
| III | 2.6 × 10$^{-5}$ |

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A block copolymer, comprising:
a first polymer block comprising a thermoplastic polymer; and
a second polymer block comprising a siloxane-based polymer that has a siloxane backbone and the following structure:

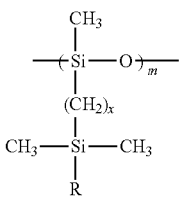

wherein x is an integer with values ranging from 2 to 12, R is selected individually for each siloxane repeat unit in the backbone, at least one R comprises an oligoethylene-oxide-containing group, and m is an integer ranging from about 2 to 2000 wherein the thermoplastic polymer comprises a vinyl polymer.

2. The block copolymer of claim 1, wherein the oligoethylene-oxide-containing group is selected from the group consisting of:

—O—(CH$_2$CH$_2$O)$_i$—CH$_3$

—(CH$_2$)$_3$O—(CH$_2$CH$_2$O)$_i$—CH$_3$

—OSi(CH$_3$)$_2$—(CH$_2$)$_3$O—(CH$_2$CH$_2$O)$_i$—CH$_3$

—OSi(CH$_3$)$_2$—OSi(CH$_3$)$_2$—(CH$_2$)$_3$O—(CH$_2$CH$_2$O)$_i$—CH$_3$

—O—(CH$_2$CH$_2$CH$_2$O)$_i$—CH$_3$

—(CH$_2$)$_3$O—(CH$_2$CH$_2$CH$_2$O)$_i$—CH$_3$

—OSi(CH$_3$)$_2$—(CH$_2$)$_3$O—(CH$_2$CH$_2$CH$_2$O)$_i$—CH$_3$

—OSi(CH$_3$)$_2$—OSi(CH$_3$)$_2$—(CH$_2$)$_3$O—(CH$_2$CH$_2$O)$_i$—CH$_3$

—O—(CH$_2$CH$_2$O)$_i$—(CH$_2$CH$_2$CH$_2$O)$_j$—CH$_3$ and

—OSi(CH$_3$)$_2$—OSi(CH$_3$)$_2$—OSi(CH$_3$)$_2$—(CH$_2$)$_3$O—(CH$_2$CH$_2$O)$_i$—CH$_3$ wherein i is an integer in the range of about 1 to 8 and:

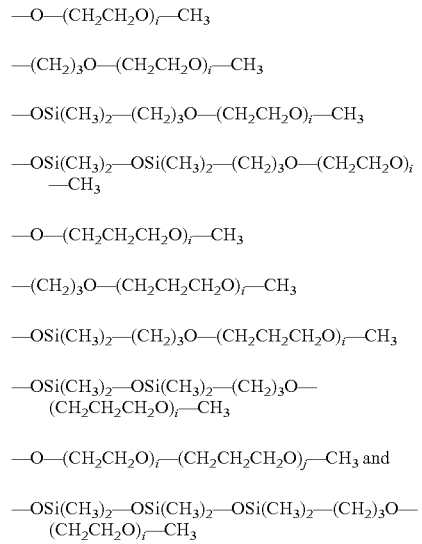

wherein X is selected from the group consisting of:

—OSi(CH$_3$)$_2$—(CH$_2$CH$_2$)—

—(CH$_2$CH$_2$)—

—(CH$_2$)$_3$OCH$_2$—;

—OSi(CH$_3$)$_2$—(CH$_2$)$_3$OCH$_2$— and wherein i is an integer in the range of about 1 to 8.

3. The block copolymer of claim 1 further comprising some R selected from the group consisting of highly polar groups, ethylene carbonates, cyano groups, N-pyrrolidone groups, and perfluoroalkyl groups.

4. The block copolymer of claim 3, wherein the ethylene carbonates are selected from the group consisting of:

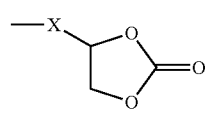

wherein X is selected from the group consisting of:

—OSi(CH$_3$)$_2$—(CH$_2$CH$_2$)—

—(CH$_2$CH$_2$)—

—(CH$_2$)$_3$OCH$_2$—

—OSi(CH$_3$)$_2$—(CH$_2$)$_3$OCH$_2$—;

—OCH$_2$; and

—OCH$_2$CH$_2$—.

5. The block copolymer of claim 3, wherein the cyano groups are selected from the group consisting of:

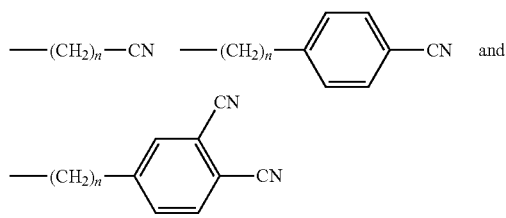

wherein n is an integer in the range of about 1 to 10.

6. The block copolymer of claim 3, wherein the N-pyrrolidone group comprises:

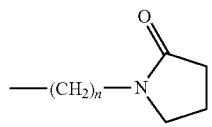

wherein n is an integer in the range of about 1 to 8.

7. The block copolymer of claim 3, wherein the perfluoroalkyl group comprises:

-(CH$_2$)$_m$(CF$_2$)$_n$—F wherein m and n are integers that are selected independently and are each in the range of about 1 to 8.

8. The block copolymer of claim 1, wherein only one kind of R group is included in the polymer.

9. The block copolymer of claim 1, wherein only two different R groups are included in the polymer.

10. The block copolymer of claim 9 wherein the second block comprises a random copolymer and the second R group is selected independently from the group consisting of oligoethylene-oxide-containing groups, highly polar groups, ethylene carbonates, cyano, N-pyrrolidone groups, and perfluoroalkyl groups.

11. The block copolymer of claim 1, wherein only three different R groups are included in the polymer.

12. The block copolymer of claim 11 wherein the second block comprises a random terpolymer and the second R group and the third R group is each selected independently from the group consisting of oligoethylene-oxide-containing groups, highly polar groups, ethylene carbonates, cyano groups, N-pyrrolidone groups, and perfluoroalkyl groups.

13. The block copolymer of claim 1, wherein R is selected individually for each siloxane repeat unit in the backbone, is selected from the group consisting of oligoethylene-oxide-containing groups, highly polar groups, ethylene carbonates, cyano groups, N-pyrrolidone groups, and perfluoroalkyl groups, and at least one R comprises an oligoethylene-oxide-containing group.

14. A block copolymer, comprising:
a first polymer block comprising a thermoplastic polymer; and
a second polymer block comprising a siloxane-based polymer comprising:
at least one oligomeric ethylene oxide pendant group; and
a polysiloxane having one or more backbone silicons linked to a first side chain and one or more backbone silicons linked to a second side chain,
wherein the first side chain comprises a poly(alkylene oxide) moiety, and the second side chain includes a cyclic carbonate moiety wherein the thermoplastic polymer comprises a vinyl polymer.

15. A block copolymer, comprising:
a first polymer block comprising a thermoplastic polymer; and
a second polymer block comprising a siloxane-based polymer comprising:
at least one oligomeric ethylene oxide pendant group; and
a disiloxane that has a backbone comprising:
a first silicon linked to a first substituent selected from a group consisting of a first side chain that includes a cyclic carbonate moiety, a first side chain that includes a poly(alkylene oxide) moiety, and a first crosslink that links the disiloxane to a second siloxane and that includes a poly(alkylene oxide) moiety; and
a second silicon linked to a second substituent selected from a group consisting of a second side chain that includes a cyclic carbonate moiety and a second side chain that includes a poly(alkylene oxide) moiety wherein the thermoplastic polymer comprises a vinyl polymer.

16. The block copolymer of claim 15 wherein at least one of the silicon atoms is linked to a side chain that includes a poly(alkylene oxide) moiety or a cyclic carbonate moiety.

* * * * *